United States Patent [19]
Wood et al.

[11] Patent Number: 4,784,010
[45] Date of Patent: Nov. 15, 1988

[54] ELECTRIC ROBOTIC WORK UNIT

[75] Inventors: Dale A. Wood, Canton; Robert J. Todd, Milford Township, Wayne County; Norman N. Fender, Hudson, all of Mich.

[73] Assignee: Graco Robotics Inc., Livonia, Mich.

[21] Appl. No.: 43,278

[22] Filed: Apr. 27, 1987

[51] Int. Cl.$^4$ ............................ G05G 11/00; B25J 9/12
[52] U.S. Cl. ........................................ 74/479; 16/1 C; 248/292.1; 901/21; 901/23; 901/48
[58] Field of Search ...................... 74/479; 901/21, 22, 901/23, 24, 48; 16/1 C; 248/292.1

[56] References Cited
U.S. PATENT DOCUMENTS

| | | | |
|---|---|---|---|
| D. 273,300 | 4/1984 | Molaug | D15/122 X |
| 4,424,473 | 1/1984 | Gorman | 901/24 X |
| 4,500,251 | 2/1985 | Kiryu et al. | 901/21 X |
| 4,531,885 | 7/1985 | Molaug | 901/21 X |
| 4,598,601 | 7/1986 | Molaug | 74/469 |
| 4,600,355 | 7/1986 | Johnson | 901/21 X |
| 4,637,773 | 1/1987 | Hakashima et al. | 901/21 X |
| 4,645,409 | 2/1987 | Gorman | 901/23 X |
| 4,696,197 | 9/1987 | Hannel | 901/48 X |

Primary Examiner—Allan D. Herrmann
Attorney, Agent, or Firm—Douglas B. Farrow

[57] ABSTRACT

An electric robot having a base unit which is rotatable about a vertical first axis is provided with a horizontal second axis to which is pivotally mounted a vertical arm. At the other end of the vertical arm, a horizontal arm is mounted which has at the end thereof a wrist for carrying a tool such as a spray gun. Motors for operation of the wrist are placed coaxially with the second axis and are placed inside the shafts for the horizontal and vertical arms. The counterbalancing mechanisms have an axis of motion which is parallel to the second axis, pulleys being used to change the direction of the tensioning cables from tangential to the second axis to parallel to the second axis.

8 Claims, 4 Drawing Sheets

ELECTRIC ROBOTIC WORK UNIT

BACKGROUND OF THE INVENTION

Robots in general are, of course, well known and have been increasingly utilized in industry to produce substantial productivity increases. Such robots have found use in a number of fields and have found particular acceptance in the finishing area where the exact repeatability of the robot provides greatly improved quality, while at the same time removing workers from what is often considered a less than ideal environment. For painting purposes, such robots are programmed by one of two methods. Either they are programmed by entering the various points and paths over which the robot will travel or they are literally taught by attaching a pendant at the arm end next to the spray gun whereby an experienced painter literally leads the end of the robot through the desired path so that the robot records the path and then is able to repeat that path at will. That path may also be later edited if desired.

Electric robots, while desirable in many ways have suffered from a general inability to be programmed by teaching. Such robots typically have a higher speed relatively low-torque motors such that the types of gear reduction utilized do not allow easy movement of the end of the robot for teaching purposes. Of course, hydraulically operated robots have been known and used extensively as well, and while such robots are known for being able to be taught, they are not always desirable for other reasons. Such robots are typified and shown in U.S. Pat. Nos. D 273,300; 4,531,885 and 4,598,601.

It is, therefore, an object of this invention to provide a robot which is extremely compact and provides a most limited footprint in the spray booth and which has an extremely wide envelope. Particularly in the spray painting area, it is extremely desirable for a robot to have as large an envelope of motion as possible. Such spray booths are extremely limited in the amount of space available and, thus, the combination of a unit with an extremely small footprint and large envelope provides an extremely advantageous combination. It is a further object of this invention to provide an efficient and compact counterbalancing mechanism which is easily adjusted depending upon the particular situation and tool being used. It is further an object of this invention to provide an electric robot which has the ability to be easily taught using a teaching pendant or a similar type device. It if further an object of this invention to provide a robot which is easily and inexpensively manufactured and which may be easily maintained under plant conditions.

SUMMARY OF THE INVENTION

A base unit is rotatably mounted around about a vertical first axis, the position of this vertical first axis being variable relative to the base unit by the use of a number of sets of holes. By variously bolting the base unit to different sets of the holes, the extent of the envelope may be varied depending on the particular situation desired. In particular, the vertical arm of the device is pivotally mounted to the base and rotates about a horizontal second axis. By variously positioning the vertical first axis, the distance between the first and second axes is varied, thereby varying the size and shape of the movement envelope.

A first shaft carries the vertical arm and rotates about the second axis, it being driven via a chain drive from a motor mounted parallel to and below the second axis. A horizontal arm shaft is rotatably mounted inside the first shaft and is also drive by a motor-mounted and below the second axis and, in fact, having an output shaft coaxial with the first motor, the horizontal arm shaft or second shaft also being chain driven. The first and second shafts mentioned above are provided with a counterbalancing mechanism which consists of a cable attached tangentially to the periphery of the respective shaft. A pivot point roller mechanism, which consists of a number of very small pulleys or rollers, is located a distance from the second axis and the distance from which it is located is variable. By changing this distance, the effective leverage of the counterbalancing mechanism may be varied to account for varying weights which may be placed upon the end of the arm. The cable, after running over the pivot rollers, then passes about a pulley whereupon it changes direction and becomes parallel to the second axis. The cable is then attached to a spring or other tensioning mechanism which may be easily adjusted to vary the static position of the two arms. The two counterbalancing mechanisms run generally parallel to one another and are located closely adjacent to each other at the rear of the machine. Placing this tensioning mechanism parallel to the axis allows for an extremely compact mechanism which, therefore, decreases the amount of footprint required to place a robot in a spray booth or other work environment.

The motors for powering the wrist ideally are three in number and are literally located inside the second or horizontal arm shaft. These motors have concentric outputs which are nested within one another and pass through the middle of the first and second shafts into the vertical arm, whereupon chains or similar motion transmitting devices transmit the motion to corresponding shafts at the joint between the vertical and horizontal arms. In the horizontal arm, such motion is then transmitted to the wrist which may be a known design.

The motors which are utilized in this invention are all direct-drive, low-speed, high-torque DC motors which allow the robot to be taught, due to the fact that any gear reduction is negligible and is performed with a simple chain and gearing mechanism having a relatively low stepdown.

The horizontal arm is located completely on one side of the vertical arm which allows an extremely wide range of motion, while at the same time greatly simplifying the sealing between the two members, that seal being a simple rotational seal.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

Figure 2:
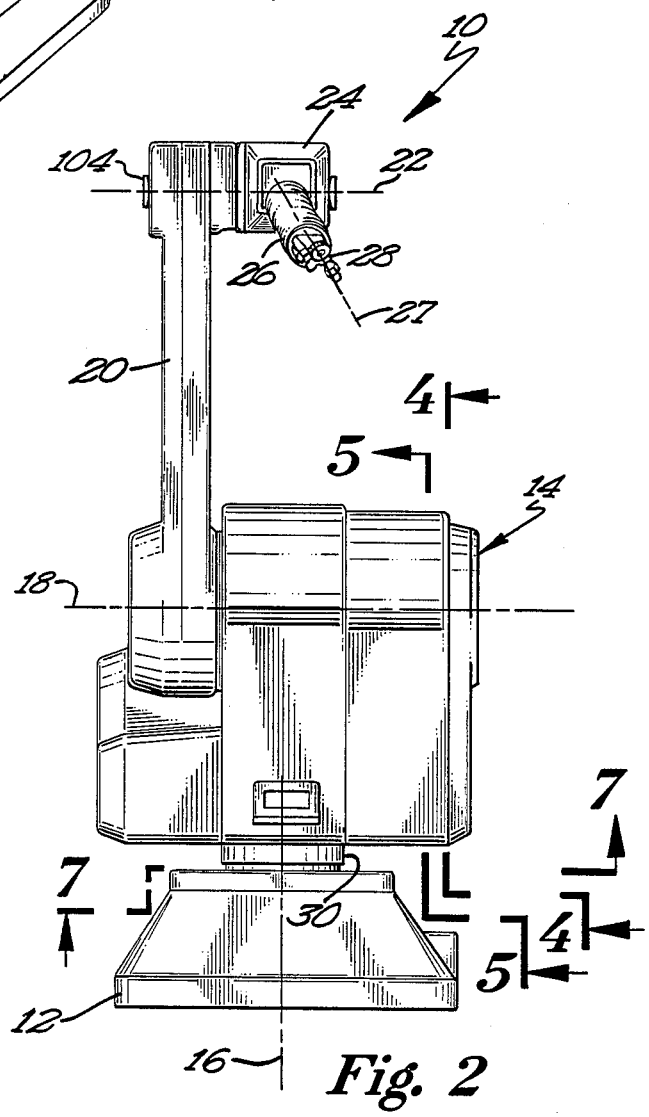
FIG. 2 is a front plan view showing the robot of the instant invention.
Figure 5:
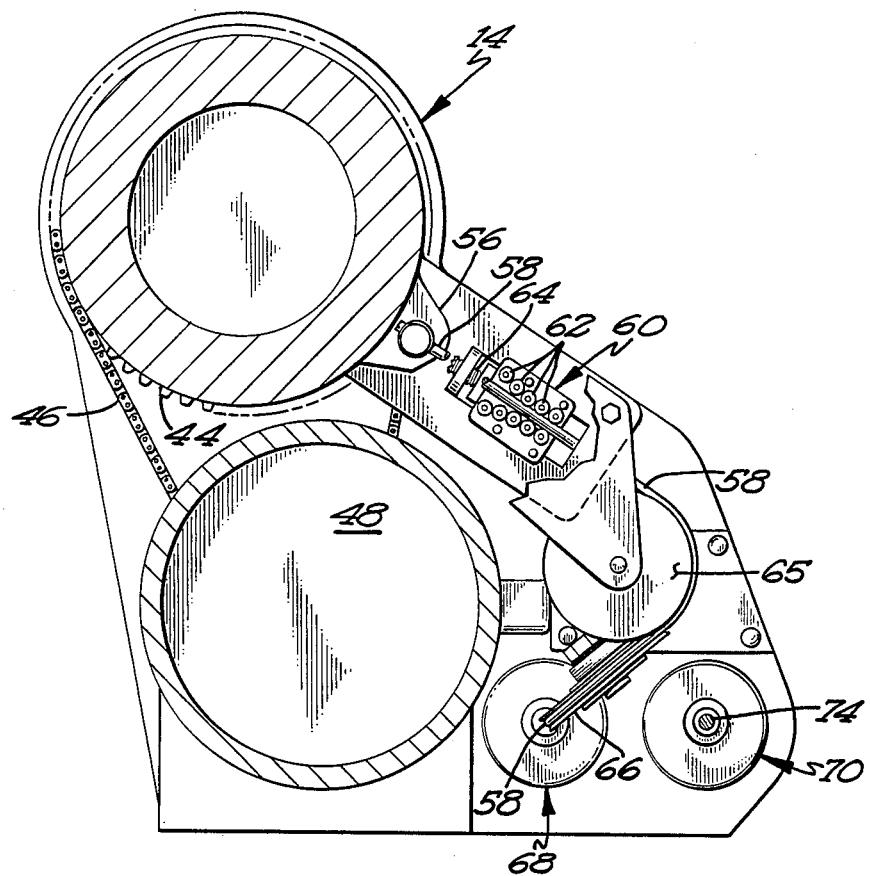

FIG. 5 a sectional view taken along line 5—5 of FIG. 2.

Figure 6:
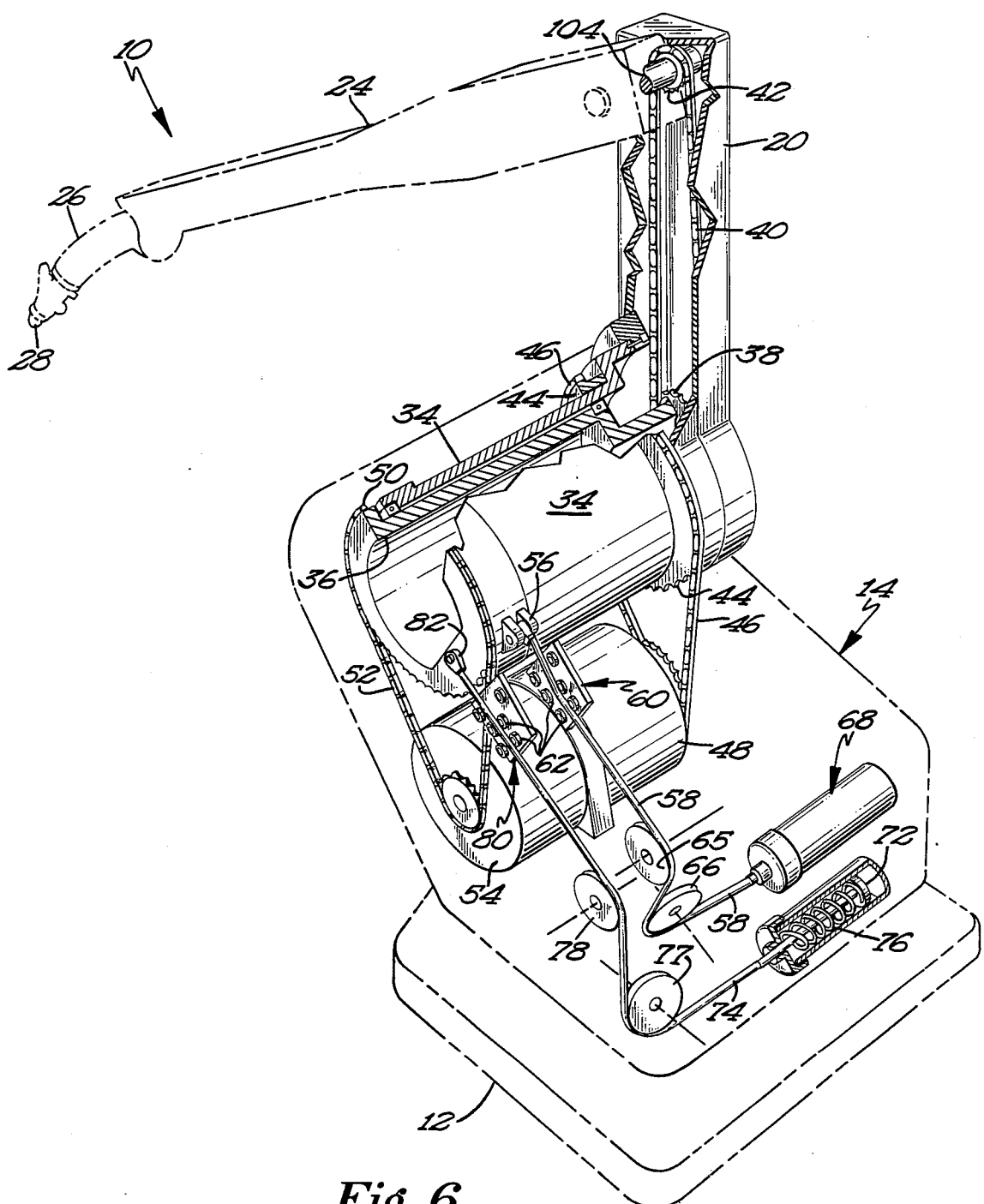

FIG. 6 a partially cut-way view showing particularly the counterbalacing mechanism.

Figure 7:
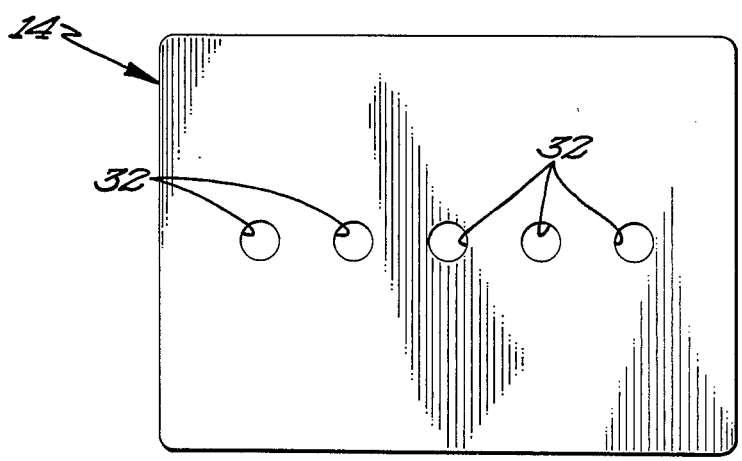

FIG. 7 shows the base unit and is taken along line 7—7 of FIG. 2.

DESCRIPTION OF THE PREFERRED EMBODIMENT

Figure 1:
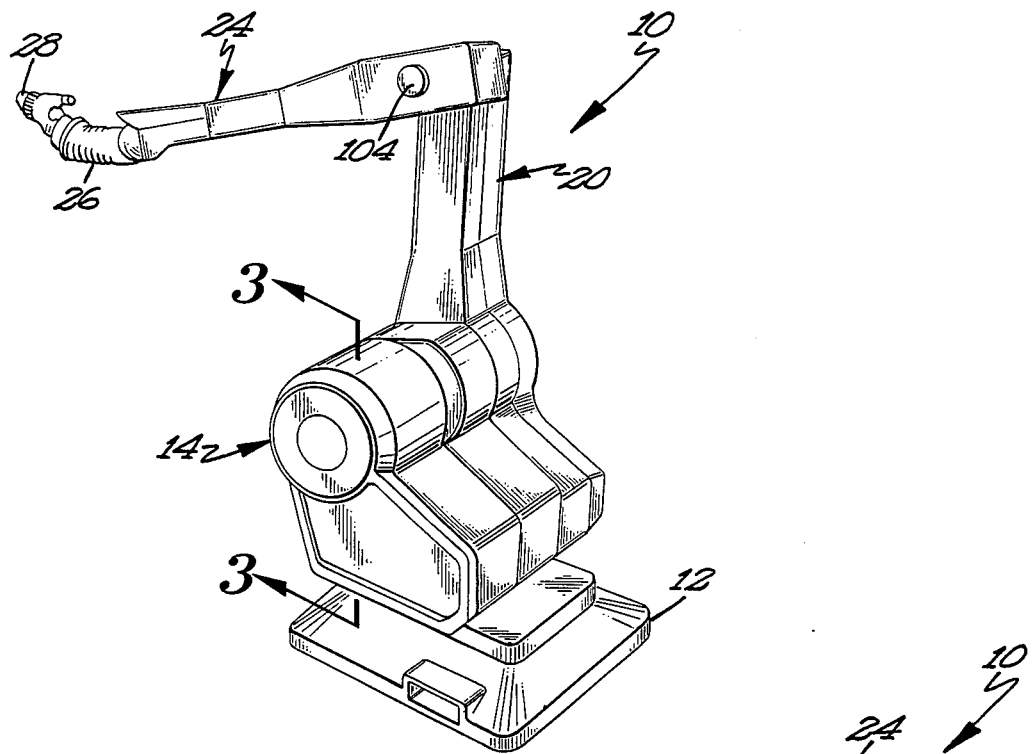
FIG. 1 is view showing the robot of the instant invention.

The robot of the instant invention, generally designated 10, is shown in general in FIG. 1. As shown there, a footplate 12 sits upon a supporting surface and has rotatably mounted on top thereof a base unit 14 which rotates about a vertical first axis 16. A horizontal second axis 18 passes through base unit 14 and has rotatably mounted thereabout vertical arm 20. Vertical arm 20 has at its opposite end, a horizontal third axis 22 passing therethrough and which is movably attached to horizontal arm 24. Attached at the output end of horizontal arm 24 is a wrist 26 which movably manipulates a tool 28 such as a spray gun which may be mounted on the end thereof. As noted previously, the instant invention is particularly designed and suited for the spraying of paints and other coating materials, it is, of course, realized that this machine may be used for other tasks if desired.

As can be seen in FIG. 7, the positioning of vertical axis 16 may be varied by variously locating the shaft 30, therefor, (shown in FIG. 2) in any of the various sets of holes 32 shown in the bottom of base unit 14. This variable positioning provides a matter of varying the spacing between the vertical first axis 16 and the horizontal second axis 18. This variability is useful in terms of providing different types of envelopes depending upon the particular situation and environment in which the robot 10 will be placed. Base unit 14 is generally formed of a casting, but of course any suitable method of construction may be used if desired.

Mounted in the base unit 14 is a hollow, vertical arm shaft 34 which is attached to vertical arm 20 and a horizontal arm shaft 36 which is rotatably mounted inside vertical arm shaft 34. Horizontal arm shaft 36 has at the output end thereof a sprocket 38 which in turn provides motive power to a chain 40 which in turn passes about a sprocket 42 which provides movement to horizontal arm 24. Sprocket 44 on the periphery of vertical arm shaft 34 is connected via a chain 46 to second axis motor 48 which is mounted parallel to and below second axis 18. Similarly, a sprocket 50 on the periphery of horizontal arm shaft 36 is connected via chain 52 to a third axis motor 54 which is mounted coaxially with second axis motor 48 but faces in the opposite direction.

Figure 4:
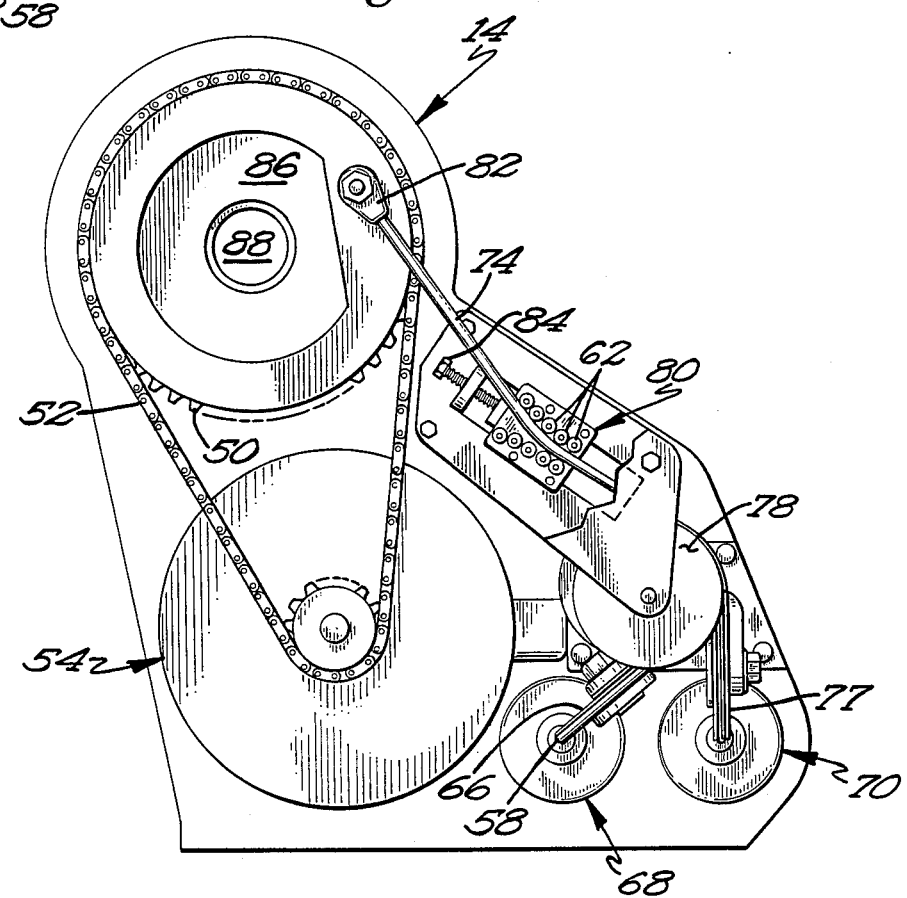
FIG. 4 is a sectional view taken along line 4—4 of FIG. 2.

The counterbalancing mechanism for the vertical arm 20 and horizontal arm 24 is shown particularly in FIGS. 4 through 6. Turning first to the vertical arm, a clevis 56 attaches a cable 58 to the periphery of vertical arm shaft 34. Cable 58 passes first through guide assembly 60 which has a plurality rollers 62 thereon which serve to guide cable 58 in the proper direction. The distance of guide assembly 60 from second axis 18 may be varied by means of a lead screw 64. Varying this distance provides an effective way to vary the counterbalance tension on the arm by changing the leverage point. After passing through guide assembly 60, cable 58 passes about pulleys 65 and 66 which are mounted to base 14 thereby changing the direction of the motion from tangential to vertical from arm shaft 34 to a direction parallel thereto. The interior workings of counterbalancing mechanism 68 are similar to that described hereinafter for the horizontal arm counterbalance 70.

Inside the housing of horizontal arm counterbalance 70, a cable end 72 is attached to the cable 74 and acts against a spring 76 to provide tensioning. Cable 74 then runs over pulleys 76 and 78 passed guide assembly 80 and attaches to a cable end 82 on the end of horizontal arm shaft 36. Similarly, a lead screw 84 is capable of varying the distance of guide assembly 80 relative to the horizontal second axis 18.

Preload to compensate for the weight of the arms may be accomplished by varying the compression on spring 76. This may further be tuned by varying the distance of guide assemblies 60 an 80 from second axis 18.

Figure 3:
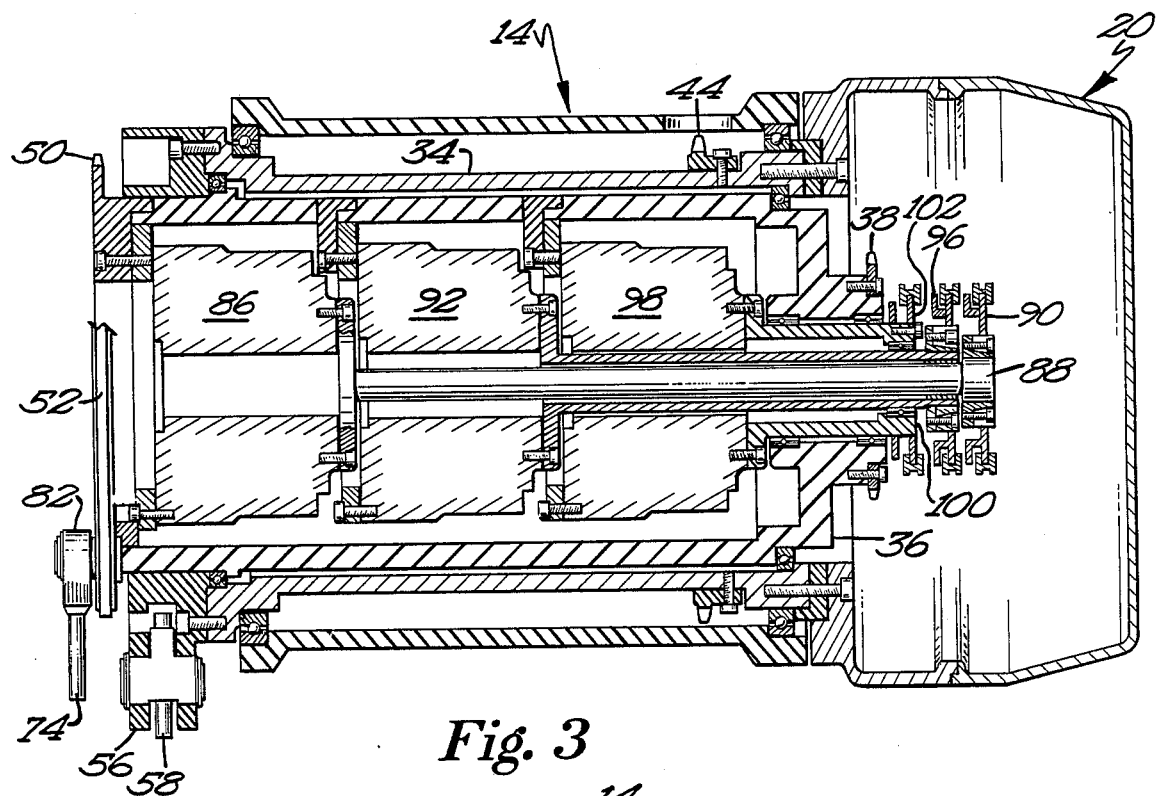
FIG. 3 is a sectional view taken along line 3—3 of FIG. 1.

FIG. 3 shows in detail the mounting of the wrist motors within horizontal arm shaft 36. First wrist motor 86 has a shaft 88 therefrom terminating in a sprocket 90 at the end. Similarly, second wrist motor 92 has a shaft 94 extending therefrom concentrically with shaft 88 and located about it terminating in sprocket 96 while third wrist motor 98 has a shaft 100 extending therefrom terminating in sprocket 102. As can be best seen in FIG. 3, the three shafts 88, 94 and 100 are all concentric and rotate coaxially with one another and at the same time concentric with shafts 34 and 36 thereby allowing uniform translation of motion into the vertical arm 20. While not shown for sake of clarity, it can easily be seen that a set of chains translate the motion from sprockets 90, 96 and 102 upwardly through the interior of arm 20 to counterpart sprockets and shafts along third axis 22. Those shafts then terminate in horizontal arm 24 where they actuate a wrist of the type such as that shown in the aforementioned U.S. patents the contents of which are hereby incorporated by reference. Such a wrist 26 may have at least one degree of freedom along a fourth axis 27.

As can be seen from the drawing figures of the instant invention, the provision of the counterbalance mechanisms 68 and 70 across the back at base 14 provides an unusually compact unit which thereby lowers the footprint required and increases the available envelope which the machine may reach. The counterbalance mechanism also is easily adjusted to suit varying arms and tools which may be used thereon with a minimum of effort. The device of the instant invention is also easily assembled and repaired when necessary.

It is contemplated that various changes and modifications may be made to the robotic work unit without departing from the spirit and scope of the invention as defined by the following claims.

What is claimed is:

1. A robotic work unit comprising:
    a base unit rotatable about a vertical first axis relative to a support surface;
    a vertical arm pivotably mounted to said base along a horizontal second axis;
    a shaft on which said vertical arm is mounted and which rotates in said base unit about said second axis;
    a horizontal arm pivotably mounted to said vertical arm along a horizontal third axis, said third axis being generally parallel to said second axis;
    a wrist mounted on said horizontal arm and movable along at least a fourth axis; and
    at least one motor for moving said wrist, each said motor being mounted in said base unit and having a rotational output coaxial with said second axis, each said wrist motor being mounted with in said shaft.

2. The robotic work unit of claim 1 further comprising:
means in said base unit for varying the distance between said first and second axis so as to vary the envelope of said robotic work unit.

3. The robotic work unit of claim 2 wherein said first axis is positionable at a number of positions along a horizontal line normal said second axis.

4. The robotic work unit of claim 1 wherein said horizontal arm is mounted to said vertical arm so as to be substantially capable of 360° rotational movement relative thereto.

5. A robotic work unit comprising:
a base unit rotatable about a vertical first axis relative to a support surface;
a vertical arm pivotably mounted to said base along a horizontal second axis;
a horizontal arm pivotably mounted to said vertical arm along a horizontal third axis, said third axis being generally parallel to said second axis; and
a wrist movable along at least a fourth axis mounted on said horizontal arm;
a first shaft attached to said vertical arm rotatable in said base along said second axis;
a second shaft coaxial with and rotatable in said first shaft and being operatively connected to said horizontal arm;
at least two wrist motors located in and coaxial with said second shaft;
third and fourth motors attached to said two wrist motors, said second, third and fourth shafts extending into said vertical arm; and
means for transferring the motion of said second, third and fourth shafts into said horizontal arm.

6. A robotic work unit comprising:
a base unit rotatable about a vertical first axis relative to a support surface;
a vertical arm pivotably mounted to said base along a horizontal second axis;
a horizontal arm pivotably mounted to said vertical arm along a horizontal third axis, said third axis being generally parallel to said second axis;
a wrist movable along at least a fourth axis mounted on said horizontal arm; and
means for counterbalancing said arms, said counterbalancing means having axes of movement parallel to said second axis and being connected to said arms tangential to said second axis.

7. The robotic work unit of claim 6 wherein said counterbalancing means comprises a flexible connecting means running over roller means the distance of which is variable relative to said second axis.

8. The robotic work unit of claim 7 wherein said flexible connecting means runs over a second pulley means changing the direction of said connecting means from normal to said second axis to parallel to said second axis.

* * * * *